United States Patent [19]

Bernhard et al.

[11] 3,874,890

[45] Apr. 1, 1975

[54] NACREOUS PIGMENTS AND PROCESS FOR THE PRODUCTION THEREOF

[75] Inventors: Horst Bernhard; Reiner Esselborn, both of Darmstadt, Germany

[73] Assignee: Merck Patent Gesellschaft mit beschrankter Haftung, Darmstadt, Germany

[22] Filed: Aug. 21, 1973

[21] Appl. No.: 390,252

[30] Foreign Application Priority Data
Sept. 9, 1972 Germany.......................... 2244298

[52] U.S. Cl................ 106/291, 106/299, 106/300, 106/304, 106/308 B
[51] Int. Cl............................................. C09c 1/00
[58] Field of Search......... 106/291, 308 B, 300, 304

[56] References Cited
UNITED STATES PATENTS

| | | | |
|---|---|---|---|
| 3,087,828 | 4/1963 | Linton | 106/291 |
| 3,711,308 | 1/1973 | Brand et al. | 106/291 |

*Primary Examiner*—Winston A. Douglas
*Assistant Examiner*—J. V. Howard
*Attorney, Agent, or Firm*—Millen, Raptes & White

[57] ABSTRACT

Golden colored nacreous pigments are produced from mica flakes coated with a layer of $TiO_2$ and/or $ZrO_2$ by a process comprising the precipitation of an iron hydroxide thereon from an aqueous iron salt solution by precipitating the iron hydroxide at a pH of above 5 from an aqeous ferrous salt solution and thereafter converting the thus-precipitated layer of iron hydroxide on the coated mica flakes to $Fe_2O_3$.

13 Claims, No Drawings

3,874,890

NACREOUS PIGMENTS AND PROCESS FOR THE PRODUCTION THEREOF

BACKGROUND OF THE INVENTION

This invention relates to a process for the production of iron oxide colored $TiO_2$ or $ZnO_2$ coated mica flakes.

Nacreous pigments whose gold hue is enhanced by the addition of iron oxides are known. For example, U.S. Pat. No. 3,711,308 and German Unexamined Published Application DOS 1,467,468 describes nacreous pigments consisting of coated translucent mica flakes. The coatings of the mica flakes are composed of metallic oxides having an average particle size of less than 100 nm. and have a thickness of about 20–250 nm. Interference colors are produced as a result of this coating on the mica flakes. Most well-known are mica flakes coated with titanium dioxide. The coatings of these conventional pigments can also contain iron oxide. Furthermore, it is also possible to apply colored metallic oxide layers on mica flakes coated with $TiO_2$ and/or $ZrO_2$ (see German Unexamined Published Application DOS 1,467,468).

A special process for the production of a lustrous pigment with iron oxide additive is described in U.S. Pat. No. 3,711,308 (German Published Application DAS 1,959,998). According to this disclosure, the layer containing the iron oxide is additionally coated with a layer of titanium and/or zirconium dioxide. In accordance with all processes known heretofore, the iron (III) oxide contained in such lustrous pigments is precipitated from iron (III) salt solutions in an acidic range.

The literature contains the general express opinion that iron (III) salt solutions must be utilized for the precipitation so that if an iron (II) salt solution is employed, it must first be oxidized to an iron (III) salt in order to obtain the desired pigments, because the desired golden-yellow hue is produced by $Fe_2O_3$.

It has now been found surprisingly that it is possible to obtain pigments of far superior brilliance and covering strength and a brighter gold hue by first precipitating iron (II) hydroxide onto the coated mica flakes from an iron (II) salt solution and then oxidizing the thus-precipitated iron hydroxide to $Fe_2O_3$. This is surprising, since the first-formed iron (II) hydroxide does not have a yellow or golden color hue but instead exhibits the known, dirty-green to black appearance of iron (II) hydroxide precipitates. Thus, it was surprising that, contrary to all previous beliefs, superior golden pigments can be obtained by the precipitation of the iron hydroxide to be deposited from ferrous salt solutions.

SUMMARY OF THE INVENTION

Improved golden colored nacreous pigments are produced from mica flakes coated with a layer of one or both of $TiO_2$ and/or $ZrO_2$ by coating them with $Fe_2O_3$ by a process which comprises the steps of precipitating iron hydroxide onto the coated mica flakes at a pH above 5, preferably between 7.5 and 9, from an aqueous iron (II) salt solution and thereafter oxidizing the layer of thus-precipitated iron oxide on the coated mica flakes to $Fe_2O_3$.

DETAILED DISCUSSION

Apparently it is necessary, in order to achieve the improved pigment effects, for the oxide or hydroxide to be present at the instant of being precipitated onto the coated mica flakes, in the low (II) oxidation stage. Surprisingly, a coating from Fe (III) salts or by precipitation from Fe (II) salts in the presence of oxidizing agents capable of oxidizing the $Fe^{++}$ ions present in the solution does not yield the improved properties.

The required oxidation of the precipitated iron hydroxide iron (III) oxide should take place gradually and only after the iron hydroxide has adhered to the particles to be coated.

Preferably, iron (II) sulfate is employed as the water-soluble iron (II) salt, for example, as $FeSO_4 \cdot 7H_2O$. However, it is also possible to use other water-soluble iron (II) salts such as, for example, ammonium iron (II) sulfates, iron (II) halides, or iron (II) oxalate. The concentration of the salt solutions of the iron (II) salt employed normally ranges between about 20 and 300 g./l., preferably between about 50 and 100 g./l.

The precipitation proper takes place from an aqueous solution of the iron (II) salts at pH values of above 5, preferably between 7.5 and 9. Specifically, for iron (II) sulfate, a pH of 8.0–8.5 is optimal. The required pH value can be achieved preferably by adding an alkali hydroxide or ammonium hydroxide or also by gaseous ammonia to the iron (II) salt solution. The pH is maintained at as nearly constant value as possible during the precipitation.

The ferrous hydroxide is precipitated in accordance with the process of this invention preferably on mica flake pigments coated with one or both of titanium dioxide or titanium dioxide hydrate respectively, zirconium dioxide or zirconium dioxide hydrate, respectively, as they are described, for example, in German Patent 2,009,566. It is especially advantageous to utilize a golden pigment, i.e., one exhibiting as the interference color a gold hue upon direct view due to the coating with $TiO_2$ and/or $ZrO_2$ on account of the layer thickness of the higher-refractive coating on the mica flakes. Such a pigment has been described, for example, in Example 9 of German Patent 2,009,566. Thus, a pigment is especially advantageous wherein the iron hydroxide is precipitated on mica flakes having a diameter of about 5–250 microns and a thickness of about 0.1–5 microns, coated uniformly with an optionally hydrated layer of titanium dioxide in an amount of about 100–300 mg. $TiO_2/m^2$ of the mica surface. Especially with such a pigment, a particularly impressive increase in the brilliance and covering power can be attained by precipitation of iron oxide thereon in accordance with this invention. Basically, it is, of course, possible to employ all of the other pigments formed from coated mica flakes, especially those having different layer thicknesses of $TiO_2$ and/or $ZrO_2$. It is also possible to conduct the precipitation of the iron hydroxides according to the process of this invention immediately following the precipitation of the $TiO_2$-hydrate and/or $ZrO_2$-hydrate layers, preferably without isolation of the intermediately produced coated mica. Also, the further processing thereof can be omitted. Thus, the hydrolysis of the iron (II) salts and the precipitation step can be effected sequentially in the same reaction vessel. It is merely necessary to vary the pH correspondingly.

The salt solution is uniformly introduced into the suspension of the particles to be coated and advantageously is fed beneath the surface of the liquid at one or several points. The feeding rate employed depends on the effectiveness of the agitator employed. The feeding rate is regulated, in order to attain optimum results, so that approximately 0.01 to $25 \cdot 10^{-5}$ mole of $Fe^{++}$ ions is fed per minute per $m^2$ of mica surface to be coated. Concurrently, with the introduction of the iron salt solution, an aqueous 0.025–10 molar alkali hydroxide or ammonium hydroxide solution, or an equivalent amount of gaseous ammonia, is fed to the reaction suspension to produce the iron hydroxide. The base is fed under controlled conditions so that the pH selected at the beginning of the coating process is always maintained at as nearly a constant value as possible.

It is also possible to add buffer systems during the hydrolysis, in order to keep the pH value constant. Such buffer systems are, for example, acetate and gylcocoll buffers of conventional composition. These can either be contained in the pigment suspension, or advantageously can be introduced alone with the alkali hydroxide or ammonium hydroxide solution. However, frequently the adding of further foreign ions is undesirable so that it is preferred to maintain the desired pH value constant by precisely metered feeding of the alkali.

As soon as the layer applied by the iron (II) salt solution has reached the desired thickness (about 1–10 nm.), the coating step is terminated. The thus-obtained pigments are worked up in accordance with conventional methods and isolated from the reaction mixture. At this point, additional special advantages are derived from the process of this invention, because the separation of the coated mica flakes is accomplished considerably more advantageously. This is because no colloidal precipitates are formed during the precipitation of the iron hydroxides from Fe (II) salts in the alkaline range. Colloidal precipitates cause extensive difficulties during the working up of the pigments and, when carrying out the process with Fe (III) salts, are practically unavoidable.

Advantageously, a post-annealing step is furthermore carried out for 0.5–5 hours at about 50°–100° C. while agitating the suspension, whereby the layers are strengthened and the iron hydroxide layer, in most cases, is partially oxidized. Thereafter, the pigment is suitably washed thoroughly with water, preferably with desalted water, optionally after first adjusting the pH to close to the neutral point. The drying step takes place in the usual manner, for example with the product being spread out in the air on hurdles in drying chambers, optionally also under reduced pressure. With the use of normal pressure, the drying temperatures range between about 90° and 150° C.

The precipitate deposited from the iron (II) salt solution is most advantageously oxidized with atmospheric oxygen. The oxidation begins normally already during the precipitation reaction, since the suspension containing the pigment particles to be coated is well agitated, so that the reaction mixture is always saturated with atmospheric oxygen. Thus, due to the large surface area of the precipitate, a partial oxidation of the iron (II) hydroxide can be initiated immediately. Since particularly good pigments are obtained by gradual oxidation, alternatively the coating step can be effected first under a nitrogen atmosphere which, however, is normally less advantageous economically, due to the associated expenditure in apparatus. When agitating under access of air, a sufficient amount of iron hydroxide for the desired success is always precipitated in the low oxidation stage. The oxidation of the $Fe^{++}$ ions present in the solution is negligible under these reaction conditions.

The complete oxidation takes place after the precipitation step. Most simply, this reaction is combined with the dehydration step, e.g., by drying the pigment in air. The simultaneous dehydration and oxidation can be effected especially advantageously from a technical viewpoint by spreading the coated mica flakes, which preferably have previously been washed, in air, for example in hurdles in a drying chamber. In this way, gradual oxidation can be very simply accomplished. For this reason, this mode of conducting the oxidation step is also preferred over other possible modes of operation, wherein an oxidizing agent, e.g., hydrogen peroxide, ammonium nitrate, or a permanganate, is added after the precipitation step to the reaction mixture or to the wash water.

Advantageously, the dried pigments are conventionally annealed, e.g., at a temperature of about 500°–1100° C. The result is a higher resistance to the effects of light and temperatures. The annealing step extends generally over periods of between 10 minutes and 5 hours. The coated mica pigment obtained after the annealing step contains, depending on the amount of iron oxide precipitated thereon, up to 20 percent, preferably about 0.5–10 percent by weight of $Fe_2O_3$.

The essential reaction conditions to be followed during the precipitation of hydroxides from metallic salts on mica flakes are amply described in all details in German Patent 2,009,566 and U.S. Pat. No. 3,711,308, whose disclosures are incorporated therein by reference. It is known from these disclosures that it is essential for producing pigments of high quality that during the precipitation the metallic salts are not supplied at a rate no faster than they can be converted to hydroxide and adsorbed on the mica flakes, and in as nearly constant concentration as possible; that as nearly constant pH as possible is maintained during the hydrolysis, and that the rate of coating, i.e., the speed of application to the mica flakes is uniform. Therefore, the hydrolysis should be conducted at a constant temperature, a constant pH and a constant feeding rate of the metallic salt solutions. As stated above, it is essential that an excess of metallic ions in the suspension is avoided. Therefore, only such an amount of metallic salt should be fed to the hydrolysis reaction per unit time as can be absorbed as hydrated metallic oxide by the surface to be coated per unit time. By exactly maintaining these conditions, very uniform coatings and pigments with a smooth surface are obtained, which pigments thus exhibit especially brilliant colors and high luster.

The nacreous pigments of this invention consist essentially of translucent micaceous flakes having an average diameter of about 5–250 microns, and a thickness of about 0.1–5 microns, and having on both faces a metallic oxide layer of uniform thickness of a metallic oxide selected from the group consisting of titanium dioxide, hydrated titanium dioxide, zirconium dioxide, hydrated zirconium dioxide, or a mixture of one or more thereof. In addition they contain $Fe_2O_3$, this oxide being present in an amount of up to 20 percent, preferably about 0.5–10 percent by weight, based upon the total weight of the pigment. The novel pigments are characterized by the $Fe_2O_3$ being present as a substantially uniform layer of about 1–10 nm. thickness on the surface of said pigment layer and stemming from an iron (II) hydroxide precipitated from a ferrous salt solution.

The pigments obtained according to the process of this invention open up entirely new fields of application, due to their astonishingly great brilliance and covering power, since the milky character of the heretofore known gold pigments of this type, which manifests itself especially, for example, when incorporated in a thick layer, such as in button panels, is eliminated. A further outstanding advantage of the pigments of this invention, compared to those known heretofore, is a markedly increased lightfastness which makes the products obtained in accordance with the disclosed process a satisfactory substitute for gold bronzes.

The colors of the nacreous pigments can best be observed when the pigments are incorporated into synthetic resin sheeting [films]. It is, of course, possible to disperse the novel pigments in the usual vehicles and further process same, just as the heretofore known lustrous pigments. The novel pigments are also eminently suitable particularly for cosmetic purposes, since they are composed from physiologically acceptable metallic oxides. However, they are utilized mainly as pigments for the dyeing, for example, of synthetic resins, cosmetic articles, such as lipsticks and soap, glass ceramic materials, varnishes, paints, as well as natural and artificial rubber articles. They are desirable because of their good light and weathering stability and, because of their temperature stability, are also suitable for enamels, for the dyeing of melts (glass) and ceramic material which is baked. Normally, the pigments are used in amounts of up to 30 percent, preferably about 0.5–10 percent by weight. In synthetic resins, the proportion is normally relatively low, for example, 0.5–3 percent, while the amount used in cosmetic preparations, e.g., lipsticks, is up to 30 percent, preferably about 5–25 percent, of the total lipstick mass.

The novel pigments show, for example, after incorporation into synthetic resin films, brilliant colors which do not change when the angle of observation is varied.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

An aqueous titanium tetrachloride solution is produced from $TiCl_4$ and hydrochloric acid containing 150 g. of $TiCl_4$/liter and 50–100 g. of HCl/liter. Four liters of fully deionized water is brought to a pH of 2.2 by adding this titanium tetrachloride solution. 200 g. of mica flakes having a particle diameter of between 10 and 30 microns and a thickness of about 0.5 micron is then added thereto and the suspension is heated to 70°–75° C. Thereafter, the titanium tetrachloride solution is fed thereto at a rate of about 450 ml./hour while simultaneously feeding a 20 percent sodium hydroxide solution to the suspension at a rate which is regulated so that the pH of the suspension remains constant within the limits of 2.2–2.5. The coating is carried out until, after about 4 hours and 50 minutes, the desired gold hue has been achieved. In total, about 2.2 liters of titanium tetrachloride solution is consumed. The mixture is stirred for approximately 10 minutes, and then the pH of the mixture is increased to 8.0 by adding 20 percent aqueous sodium hydroxide.

Thereafter, a ferrous sulfate solution containing 15 g. of $FeSO_4 \cdot 7H_2O$ and 1 ml. of concentrated sulfuric acid per 100 ml. of solution is added at a rate of 400 ml./hour. By the simultaneous addition of sodium hydroxide solution (20%), the pH is maintained at a substantially constant 8.0 by metered feeding. The iron hydroxide is precipitated as a greenish-black deposit and coats the pigment particles. After adding 400 ml. of $FeSO_4$ solution, the coating step is terminated and the reaction mixture is stirred for 1 hour at 70°–75° C. and allowed to stand overnight. Then, the pigment is separated and washed with fully desalted water. After drying in open hurdles in a drying chamber at about 130° C., the now yellowish-golden pigment is annealed for 30 minutes at 950° C., thus obtaining a brilliantly golden pigment containing 4.8% $Fe_2O_3$.

EXAMPLE 2

10 kg. of the mica employed in Example 1 is suspended in 150 liters of fully desalted water. The suspension is adjusted to a pH of approximately 3.5 by adding a hydrochloric zirconium tetrachloride solution (250 g. of $ZrCl_4$ and 40 g. of HCl/liter). The suspension is heated under agitation to 70° C. and then again adjusted to a pH of 3.5 by adding 10 percent hydrochloric acid. Thereafter, additional amounts of the hydrochloric acid-zirconium tetrachloride solution are poured into the suspension at a rate of 6 l./hour. The pH is kept constant at 3.5 by the simultaneous addition of 35 percent NaOH. The coating step takes about 10 hours. The thus-obtained pigment is agitated in the suspension for about another 10 minutes. Then the pH is raised to 8.5 by the introduction of ammonia.

An iron sulfate solution at a rate of 20 liters/hour containing 150 g. of $FeSO_4 \cdot 7H_2O$ and 10 ml. of concentrated sulfuric acid per liter of solution is then added in metered quantities. By the simultaneous addition of a 20 percent sodium hydroxide solution, the pH is maintained at a substantially constant 8.0. After adding 20 liters of iron sulfate solution, the coating step is terminated and the product worked up as described in Example 1.

The pigment obtained after annealing contains about 53.2 percent of mica, about 42.2 percent of $ZrO_2$, and about 4.6 percent of $Fe_2O_3$.

In place of the above $ZrCl_4$ solution, various mixtures of $TiCl_4$ and $ZrCl_4$, e.g., in a ratio of 1 : 1 or 3 : 1, can also be employed. Also in this way, pigments of high brilliance and covering power are obtained.

EXAMPLE 3

A titanium tetrachloride solution containing 150 g. of $TiCl_4$/liter and 50–100 g. of HCl/liter is added to 4 liters of fully deionized water until a pH of 2.2 is attained. Then, 200 g. of mica flakes is added as described in Example 1, and the flakes are coated with titanium dioxide hydrate. Thereafter, the pH is brought to 8.0 by the addition of 20 percent aqueous NaOH.

Subsequently, a solution containing 43 g. of $FeCl_2 \cdot 4H_2O$ and 10 ml. of 37 percent hydrochloric acid in 300 ml. of water is added in metered amounts at a rate of 300 ml./hour. By the simultaneous addition of NaOH, the pH is kept constant at 8.0–8.5. The iron hydroxide is precipitated onto the coated flakes as a greenish-black deposit. The reaction mixture is then worked up analogously to Example 1 to produce a bright golden pigment.

EXAMPLE 4

The coating step and the working up operation are effected analogously to Example 3 except that in place of the $FeCl_2$ solution, a solution is added containing 39 g. of Fe (II) oxalate · $2H_2O$ in one liter of 20 percent hydrochloric acid.

A brilliant gold pigment is thus produced having a high covering power.

EXAMPLE 5

The coating and working up steps are conducted analogously to Example 1, except that in place of 200 g. of mica flakes of the dimensions set forth therein, 340 g. of mica flakes having a particle diameter of between 50 and 150 microns and a thickness of 0.2–5 microns (specific surface area about 2.0–2.5 $m^2/g$.) are employed. A brilliant gold pigment is thus produced having a strong glitter effect. The annealed pigment contains 3.5 percent of $Fe_2O_3$.

EXAMPLE 6

The coating and working up operations are conducted analogous to Example 1, but in place of 200 g. of mica flakes of the dimensions set forth therein, 130 g. of mica flakes having a particle diameter of between 5 and 15 microns and a thickness of 0.1 - 0.5 micron (specific surface area about 5.5–6.0 $m^2/g$.) are used for coating. A brilliant gold pigment is obtained having a velvet-like luster. The annealed pigment contains 6.0 percent of $Fe_2O_3$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of golden nacreous pigments by coating mica flakes with a layer of $Fe_2O_3$-containing $TiO_2$, $ZrO_2$, or mixtures thereof, which comprises the steps of precipitating iron hydroxide solution onto mica flakes coated with $TiO_2$, $ZrO_2$, or a mixture thereof, by adding an aqueous Fe (II) salt solution to a suspension of the mica flakes at a constant temperature and a constant pH above 5 and a rate of addition not exceeding the rate at which the salt is converted to hydroxide and adsorbed on the mica flakes, and thereafter oxidizing the deposited iron hydroxide to $Fe_2O_3$.

2. A process according to claim 1, wherein the Fe (II) salt is iron (II) sulfate.

3. A process according to claim 1, wherein the precipitation is conducted at a pH of from 7.5 to 9.

4. A process according to claim 3, wherein the precipitation is conducted at a pH of from 8.0 to 8.5.

5. A process according to claim 1, wherein the oxidation is effected with air.

6. A process according to claim 5, wherein the oxidation is conducted concurrently with a drying step to dry the coated mica flakes.

7. A process according to claim 5, wherein the oxidation is conducted at least partially by introducing air into the solution from which the iron hydroxide is precipitated.

8. A process according to claim 1, wherein the mica flakes are coated with $TiO_2$ hydrate.

9. A process according to claim 7, wherein the mica flakes have a diameter of about 5–250 microns and a thickness of about 0.1–5 microns and which are uniformly coated with a layer of about 100–300 mg. of $TiO_2/m^2$ of mica surface.

10. A process according to claim 1, wherein an amount of iron hydroxide is precipitated corresponding to up to 20 percent by weight calculated on the final pigment, of $Fe_2O_3$.

11. A process according to claim 10, wherein an amount of iron hydroxide corresponding to about 0.5–10 percent by weight of $Fe_2O_3$, calculated on the final pigment, is deposited on the coated mica flakes.

12. A golden nacreous pigment of improved brilliance and covering power, consisting essentially of translucent mica flakes coated with a pigment layer of $TiO_2$, $ZrO_2$, or mixtures thereof, having a substantially uniform layer of $Fe_2O_3$ of about 1–10 nm thickness on the surface of the pigment layer and produced according to the process of claim 1.

13. A pigment according to claim 12 wherein the mica flakes have a diameter of about 5–250 microns and a thickness of about 0.1–5 microns and which are uniformly coated with a layer of about 100–300 mg. of $TiO_2/m^2$ of mica surface, and a uniform coating of 0.5–10% by weight of $Fe_2O_3$.

* * * * *